(12) United States Patent
Jung

(10) Patent No.: US 12,386,456 B2
(45) Date of Patent: Aug. 12, 2025

(54) TOUCH DRIVING CIRCUIT, TOUCH DISPLAY DEVICE, AND SENSING SYSTEM

(71) Applicant: LG Display Co., Ltd., Seoul (KR)

(72) Inventor: Sojung Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/501,371

(22) Filed: Nov. 3, 2023

(65) Prior Publication Data

US 2024/0211070 A1 Jun. 27, 2024

(30) Foreign Application Priority Data

Dec. 27, 2022 (KR) .......................... 10-2022-0186362

(51) Int. Cl.
*G06F 3/041* (2006.01)
(52) U.S. Cl.
CPC ................................ *G06F 3/04166* (2019.05)

(58) Field of Classification Search
None
See application file for complete search history.

(56) References Cited

U.S. PATENT DOCUMENTS

2020/0192544 A1* 6/2020 Chung ................ G06F 3/04166

* cited by examiner

*Primary Examiner* — Duane N Taylor, Jr.
(74) *Attorney, Agent, or Firm* — Fenwick & West LLP

(57) ABSTRACT

A touch driving circuit is disclosed that transmits touch sensing data and identifies an address signal and a command signal to determine whether to maintain transmission of touch sensing data during a period while a touch controller transmits an address signal and a command signal to the touch driving circuit according to start of communication between the touch controller and the touch driving circuit. Thus, it is possible to reduce the transmission/reception time of touch sensing data and power consumption of the touch sensing system.

18 Claims, 9 Drawing Sheets

TOUCH DRIVING CIRCUIT, TOUCH DISPLAY DEVICE, AND SENSING SYSTEM

CROSS-REFERENCE TO RELATED APPLICATION

This application claims priority from Republic of Korea Patent Application No. 10-2022-0186362, filed on Dec. 27, 2022, which is hereby incorporated by reference in its entirety.

BACKGROUND

Field

Embodiments of the disclosure relate to a touch driving circuit, a touch display device, and a sensing system.

Description of Related Art

The display device may recognize the user's touch on the display panel and perform input processing based on the recognized touch so as to provide more various functions to the user.

For example, the display device may include a plurality of touch electrodes disposed in or on a display panel and a touch sensing system that drives the plurality of touch electrodes and detects a touch using an obtained sensing signal.

For example, the touch sensing system may include a touch driving circuit for driving the touch electrode and obtaining a sensing signal and a touch controller for receiving sensing data according to the sensing signal from the touch driving circuit and detecting the presence of a touch and touch coordinates based on the sensing data.

The touch driving circuit and the touch controller may transmit/receive commands and sensing data required for touch sensing, and communication efficiency between the touch driving circuit and the touch controller may affect the efficiency or performance of the touch sensing.

SUMMARY

Embodiments of the disclosure may provide a method for enhancing touch sensing performance by a touch sensing system by enhancing the communication efficiency between the touch driving circuit and the touch controller.

In one embodiment, a touch display device, comprises: a plurality of touch electrodes; a plurality of touch lines electrically connected with the plurality of touch electrodes; a touch driving circuit configured to drive the plurality of touch lines; and a touch controller configured to control the touch driving circuit, wherein the touch driving circuit is configured to generate touch sensing data according to a touch sensing signal received through at least one of the plurality of touch lines, and the touch driving circuit is configured to transmit the touch sensing data to the touch controller through a second data transmission line during a period while the touch controller transmits an address signal or a command signal to the touch driving circuit through a first data transmission line responsive to the touch controller changing a level of a signal on a communication control line to a communication start level that is indicative to start communication between the touch driving circuit and the touch controller.

In one embodiment, a touch driving circuit, comprises: a sensing data generation circuit configured to generate touch sensing data according to a touch sensing signal received through at least one of a plurality of touch lines: and a sensing data transmission circuit configured to transmit the touch sensing data to a touch controller according to a first clock signal group received through a clock signal line responsive to a level of a signal on a communication control line changing to a communication start level that is indicative to start communication between the touch driving circuit and the touch controller.

In one embodiment, a sensing system comprises: a sensing driving circuit configured to generate sensing data according to a sensing signal obtained through a sensing line; and a sensing controller configured to control the sensing driving circuit, wherein the sensing driving circuit is configured to transmit the sensing data to the sensing controller through a data transmission line according to a first clock signal group received through a clock signal line responsive to the sensing controller changing a level of a signal on a communication control line to a communication start level that is indicative to start communication between the sensing driving circuit and the sensing controller.

In one embodiment, a touch display device comprises: a display panel: a plurality of touch electrodes in the display panel: a touch driving circuit configured to transmit a touch driving signal to the plurality of touch electrodes and receive a touch sensing signal via a plurality of touch lines: and a touch controller configured to communicate with the touch driving circuit, wherein the touch driving circuit is configured to generate first touch sensing data based on the touch sensing signal and transmit the first touch data to the touch controller without the touch controller requesting the first touch sensing data.

Embodiments of the disclosure enable required data transmission/reception by reducing the communication period between the touch driving circuit and the touch controller. Thus, there may be provided a touch sensing system and touch display device capable of low power consumption by reducing power consumption and enhancing communication efficiency.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
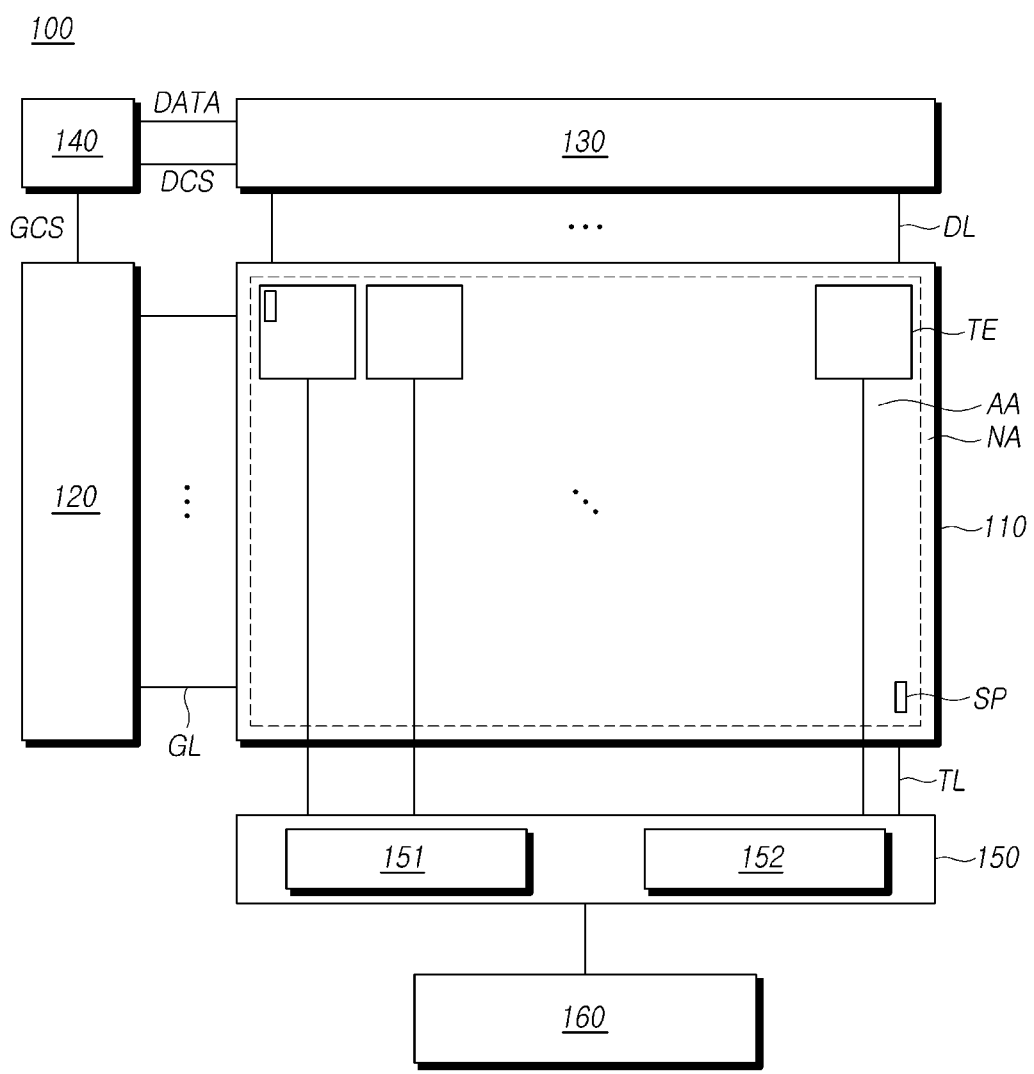
FIG. 1 is a view schematically illustrating a configuration of a touch display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors e.g., process factors, internal or external impact, noise, etc.) even when a relevant description is not specified. Further, the term "may" fully encompasses all the meanings of the term "can".

Hereinafter, various embodiments of the disclosure will be described in detail with reference to accompanying drawings.

FIG. 1 is a view schematically illustrating a configuration of a touch display device 100 according to embodiments of the disclosure.

Referring to FIG. 1, a touch display device 100 may include a display panel 110, a gate driving circuit 120, a data driving circuit 130, and a controller 140 for driving the display panel 110.

The display panel 110 may include an active area AA in which a plurality of subpixels SP are disposed and a non-active area NA positioned outside the active area AA.

The display panel 110 may include a plurality of gate lines GL, a plurality of data lines DL, and subpixels SP at the crossings of the gate lines GL and the data lines DL.

The touch display device 100 may include a plurality of touch electrodes TE disposed in or on the display panel 110 for touch sensing. The touch display device 100 may include at least one touch driving circuit 150 that drives the touch electrode TE. The touch display device 100 may include a touch controller 160 that controls the touch driving circuit 150. The touch driving circuit 150 and the touch controller 160 together may be referred to as a touch sensing system.

The sensing system of the present disclosure may include a sensing driving circuit generating sensing data according to a sensing signal obtained through a sensing line, and a sensing controller controlling the sensing driving circuit. The sensing driving circuit may transmit the sensing data to the sensing controller through a data transmission line according to a first clock signal group received through a clock signal line if the sensing controller changes a level of a communication control line to a communication start level. The communication start level may be indicative to start communication between the touch driving circuit 150 and the touch controller 160. The sensing driving circuit may receive an address signal or a command signal from the sensing controller through a data transmission line other than the data transmission line through which the sensing data is transmitted during a period when the first clock signal group is received.

The plurality of touch electrodes TE may be disposed in the active area AA. Each of the plurality of touch electrodes TE may be disposed in an area corresponding to two or more subpixels SP.

A plurality of touch lines TL that are electrically connected to the touch electrodes TE may be disposed in or on the display panel 110.

A configuration for display driving in the touch display device 100 is described. The gate driving circuit 120 may be controlled by the controller 140 to sequentially output scan signals to the plurality of gate lines GL disposed in the display panel 110, controlling the driving timing of the subpixels SP.

The gate driving circuit 120 may include one or more gate driver integrated circuits GDIC. Depending on driving schemes, the gate driving circuit 120 may be positioned on only one side, or each of two opposite sides, of the display panel 110.

Each gate driver integrated circuit GDIC may be connected to a bonding pad of the display panel 110 in a tape automated bonding (TAB) manner or a chip on glass (COG) manner. Alternatively, each gate driver integrated circuit GDIC may be implemented in a gate in panel (GIP) type and directly disposed on the display panel 110. Alternatively, each gate driver integrated circuit GDIC may be integrated and disposed on the display panel 110. Alternatively, each gate driver integrated circuit GDIC may be implemented in a chip on film (COF) manner to be mounted on a film connected to the display panel 110.

The data driving circuit 130 may receive image data DATA from the timing controller 140 and convert the image data DATA into an analog data voltage. The data driving circuit 130 may output the data voltage to the data line DL according to the timing at which the scan signal is applied through the gate line GL. Accordingly, each subpixel SP may represent the brightness according to the data voltage.

The data driving circuit 130 may include one or more source driver integrated circuits SDIC.

Each source driver integrated circuit SDIC may include a shift register, a latch circuit, a digital-to-analog converter, an output buffer, and the like.

Each source driver integrated circuit SDIC may be connected to a bonding pad of the display panel 110 in a tape automated bonding (TAB) manner or a chip on glass (COG) manner. Alternatively, each source driver integrated circuit SDIC may be directly disposed on the display panel 110. Alternatively, each source driver integrated circuit SDIC may be integrated and disposed on the display panel 110. Alternatively, each source driver integrated circuit SDIC may be implemented by a chip on film (COF) method. In this case, each source driver integrated circuit SDIC may be mounted on a film connected to the display panel 110 and may be electrically connected to the display panel 110 through lines on the film.

The controller 140 may supply various control signals to the gate driving circuit 120 and the data driving circuit 130 and control the operation of the gate driving circuit 120 and the data driving circuit 130.

The controller 140 may be mounted on a printed circuit board or a flexible printed circuit and may be electrically connected with the gate driving circuit 120 and the data driving circuit 130 through the printed circuit board or the flexible printed circuit.

The controller 140 may enable the gate driving circuit 120 to output scan signals according to the timing set in each frame, convert image data received from the outside to meet the data signal format used by the data driving circuit 130, and output the resultant image data DATA to the data driving circuit 130.

The controller 140 may receive, from outside of the controller 140 (e.g., host system), various timing signals including a vertical synchronization signal VSYNC, a horizontal synchronization signal HSYNC, an input data enable signal DE, and a clock signal CLK, together with the image data.

The controller 140 may generate a diversity of control signals using the timing signals received from the outside and output the control signals to the gate driving circuit 120 and the data driving circuit 130.

As an example, to control the gate driving circuit 120, the controller 140 may output various gate control signals GCS including a gate start pulse GSP, a gate shift clock GSC, and a gate output enable signal GOE.

The gate start pulse GSP may control the operation start timing of one or more gate driver integrated circuits GDICs constituting the gate driving circuit 120. The gate shift clock GSC is a clock signal commonly input to one or more gate driver integrated circuits GDICs and may control the shift timing of the scan signals. The gate output enable signal GOE may designate timing information about one or more gate driver integrated circuits GDICs.

Further, to control the data driving circuit 130, the controller 140 may output various data control signals DCS including a source start pulse SSP, a source sampling clock SSC, and a source output enable signal SOE, for example.

The source start pulse SSP may control the data sampling start timing of one or more source driver integrated circuits SDICs constituting the data driving circuit 130. The source sampling clock SSC is a clock signal for controlling the sampling timing of data in each source driver integrated circuit (SDIC). The source output enable signal SOE may control the output timing of the data driving circuit 130.

The touch display device 100 may further include a power management integrated circuit that supplies various voltages or currents to, e.g., the display panel 110, the gate driving circuit 120, and the data driving circuit 130 or controls various voltages or currents to be supplied.

A configuration for touch sensing in the touch display device 100 is described. The touch driving circuit 150 may drive a plurality of touch electrodes TE disposed in or on the display panel 110. The touch driving circuit 150 may supply a touch driving signal to the touch electrode TE through the touch line TL and may receive a touch sensing signal from the touch electrode TE.

The touch electrode TE may be positioned outside the display panel 110 or may be positioned inside the display panel 110.

When the touch electrode TE is positioned inside the display panel 110, the touch electrode TE may be an electrode disposed separately from an electrode for display driving. Alternatively, the touch electrode TE may be one of the electrodes for display driving.

For example, the touch electrode TE may be an electrode split from the common electrode (or cathode electrode) for display driving. In this case, the touch electrode TE may function as an electrode for touch sensing and an electrode for display driving.

For example, the touch electrode TE may be driven as a common electrode and a touch electrode TE in temporally split periods.

In this case, touch driving signals may be supplied to the touch electrodes TE through the touch lines TL during the period when touch sensing is performed. In a period distinct from the period during which touch sensing is performed, a voltage for display driving may be supplied to the touch electrode TE to perform display driving.

Alternatively, the touch electrode TE may simultaneously function as a touch electrode TE and a common electrode. In this case, since the touch driving signal is applied to the touch electrode TE during the display driving period, the signal for display driving (e.g., a data voltage or a scan signal) may be supplied in a form modulated based on the touch driving signal.

As described above, the touch driving circuit 150 may perform touch sensing by supplying the touch driving signal to the touch electrode TE during a display driving period or a period temporally divided from the display driving period.

For example, the touch driving circuit 150 may include a sensing data generation module 151 (e.g., a circuit such as an analog to digital converter) that converts the touch sensing signal obtained from the touch electrode TE into a digital touch sensing data and a sensing data transmission module 152 (e.g., a circuit such as a communication interface) that transmits the touch sensing data to the touch controller 160. The sensing data transmission module 152 may transmit the touch sensing data to an outside according to a first clock signal group received through a clock signal line if a level of a communication control line is changed to a communication start level.

The touch controller 160 may detect the presence of a touch and touch coordinates based on touch sensing data transmitted from the touch driving circuit 150.

The touch driving circuit 150 and the touch controller 160 may transmit/receive data through two or more communication lines.

Figure 2:
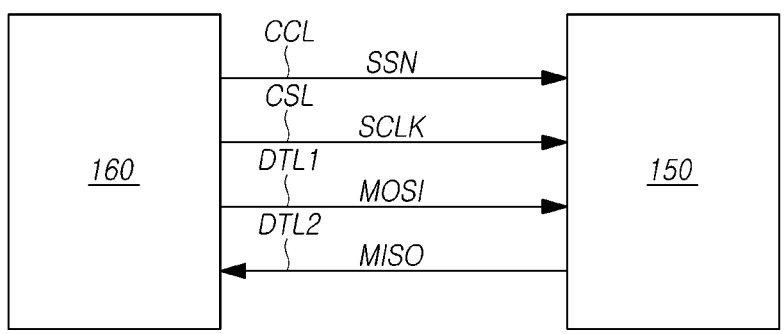
FIG. 2 is a view illustrating an example communication structure between a touch driving circuit and a touch controller included in a touch display device according to embodiments of the disclosure.

FIG. 2 is a view illustrating an example communication structure between a touch driving circuit 150 and a touch controller 160 included in a touch display device 100 according to embodiments of the disclosure.

Referring to FIG. 2, a structure in which the touch driving circuit 150 and the touch controller 160 transmit/receive data through a plurality of communication lines (e.g., four) is shown as an example. In some cases, the touch driving circuit 150 and the touch controller 160 may transmit/receive data through additional communication lines other than the four shown in FIG. 2 or may transmit/receive data through fewer than four communication lines.

The touch controller 160 and the touch driving circuit 150 may transmit/receive data using a communication control line CCL, a clock signal line CSL, a first data transmission line DTL1, and a second data transmission line DTL2 in one embodiment.

The communication control line CCL may be a line through which a signal for controlling a communication period between the touch controller 160 and the touch driving circuit 150 is transmitted. For example, a communication control signal SSN may be transmitted through the communication control line CCL.

The touch controller 160 may control the level of the communication control signal SSN transmitted through the communication control line CCL, and may control a period during which communication is performed between the touch controller 160 and the touch driving circuit 150.

The clock signal line CSL may be a line through which the clock signal SCLK is transmitted between the touch controller 160 and the touch driving circuit 150. The touch controller 160 may transmit the clock signal SCLK through the clock signal line CSL during the period when communication with the touch driving circuit 150 is performed.

The first data transmission line DTL1 may be a line through which the touch controller 160 transmits data to the touch driving circuit 150. The touch controller 160 may transmit an address signal, a command signal, or other data to the touch driving circuit 150 through the first data transmission line DTL1.

The second data transmission line DTL2 may be a line through which the touch driving circuit 150 transmits data to the touch controller 160. The touch driving circuit 150 may transmit a touch interrupt signal and touch sensing data to the touch controller 160 through the second data transmission line DTL2.

Each of the first data transmission line DTL1 and the second data transmission line DTL2 may provide unidirectional communication. Alternatively, at least one of the first data transmission line DTL1 and the second data transmission line DTL2 may provide bi-directional communication.

The data transmitted by the touch controller 160 through the first data transmission line DTL1 or the data transmitted by the touch driving circuit 150 through the second data transmission line DTL2 may be transmitted through the first data transmission line DTL1 and the second data transmission line DTL2.

If the level of the communication control line CCL reaches a communication start level according to a preset protocol, the touch controller 160 and the touch driving circuit 150 may transmit/receive commands and data through the first data transmission line DTL1 and the second data transmission line DTL2.

Further, communication between the touch controller 160 and the touch driving circuit 150 may be performed in such a manner as to reduce communication time and power consumption of the touch sensing system including the touch controller 160 and the touch driving circuit 150.

FIGS. 3 to 8 are views illustrating an example method for transmitting/receiving data between a touch driving circuit 150 and a touch controller 160 included in a touch display device 100 according to embodiments of the disclosure.

Figure 3:
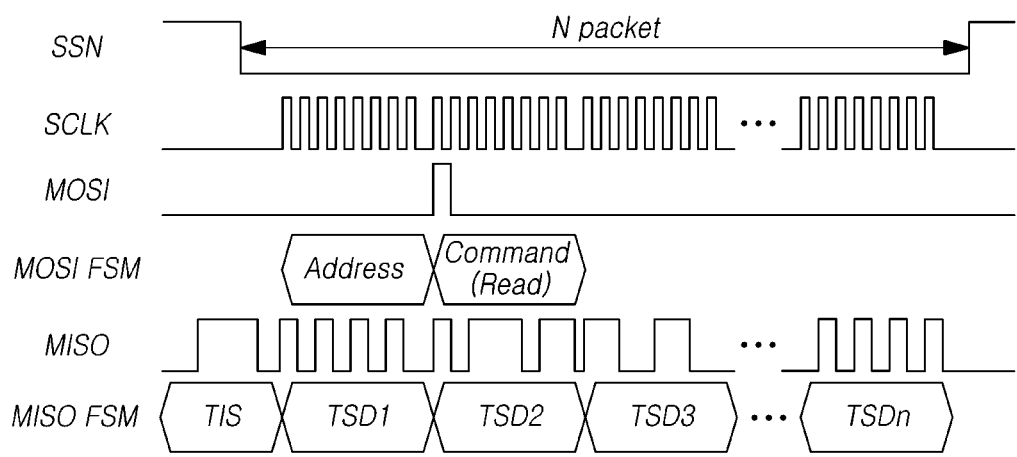
FIGS. 3, 4, 5, 6, 7, and 8 are views illustrating an example method for transmitting/receiving data between a touch driving circuit and a touch controller included in a touch display device according to embodiments of the disclosure.

Referring to FIG. 3, the level of the communication control signal SSN transmitted through the communication control line CCL by the touch controller 160 may change from a high level (e.g., first level) to a low level (e.g., second level) that is less than the high level.

A period when the level of the communication control signal SSN transmitted through the communication control line CCL is a low level may be a period when communication between the touch controller 160 and the touch driving circuit 150 is performed. In this case, the low level of the communication control line CCL may be referred to as a communication start level.

In other embodiments, a period when the level of the communication control signal SSN is a high level may be a period when communication is performed.

Data may be transmitted/received through the first data transmission line DTL1 and the second data transmission line DTL2 during the period when the communication control line CCL is at the communication start level. The MOSI (Master Out Slave In) shown in FIG. 3 may mean the level of the first data transmission line DTL1 through which data is transmitted, and MOSI FSM (Finite State Machine) may mean a type of data transmitted through the first data transmission line DTL1. MISO may mean the level of the second data transmission line DTL2 through which data is transmitted, and MISO FSM may mean a type of data transmitted through the second data transmission line DTL2.

The touch driving circuit 150 may transmit a touch interrupt signal TIS to the touch controller 160 through the second data transmission line DTL2 before the level of the communication control line CCL reaches the communication start level.

The touch interrupt signal TIS may be a signal transmitted to the touch controller 160 for the touch driving circuit 150 to generate and store touch sensing data according to touch sensing using the touch electrode TE and inform the touch controller 160 that transmission of touch sensing data is ready.

The touch interrupt signal TIS may be transmitted before the level of the communication control line CCL reaches the communication start level. Alternatively, transmission of the touch interrupt signal TIS may be started before the level of the communication control line CCL reaches the communication start level. Transmission of the touch interrupt signal TIS may be complete before the level of the communication control line CCL reaches the communication start level and may start before the level of the communication control line CCL reaches the communication start level, or may be complete after the level of the communication control line CCL reaches the communication start level.

The touch driving circuit 150 may transmit the touch interrupt signal TIS to the touch controller 160 through the second data transmission line DTL2, and transmit the touch sensing data to the touch controller 160 through the second data transmission line DTL2 according to a first clock signal group received through a clock signal line CSL, after the transmission of the touch interrupt signal TIS is complete.

The touch controller 160 may transmit the clock signal SCLK through the clock signal line CSL when the level of the communication control line CCL reaches the communication start level. The touch controller 160 may transmit an address signal and a command signal through the first data transmission line DTL1 when the level of the communication control line CCL reaches the communication start level.

The touch sensing data transmitted from the touch driving circuit 150 to the touch controller 160 may be transmitted during the period when the touch controller 160 transmits the address signal or the command signal to the touch driving circuit 150.

For example, during the period when the touch controller 160 transmits the address signal to the touch driving circuit 150 through the first data transmission line DTL1, the touch driving circuit 150 may transmit first touch sensing data TSD1 to the touch controller 160 through the second data transmission line DTL2.

During the period when the touch controller 160 transmits the command signal to the touch driving circuit 150 through the first data transmission line DTL1, the touch driving circuit 150 may transmit the second touch sensing data TSD2 to the touch controller 160 through the second data transmission line DTL2.

During the period when the first clock signal SCLK group is transmitted through the clock signal line SCL after the level of the communication control line CCL reaches the communication start level, the address signal may be transmitted through the first data transmission line DTL1, and the first touch sensing data TSD1 may be transmitted through the second data transmission line DTL2. During the period when the second clock signal SCLK group is transmitted through the clock signal line SCL after the level of the communication control line CCL reaches the communication start level, the command signal may be transmitted through the first data transmission line DTL1, and the second touch sensing data TSD2 may be transmitted through the second data transmission line DTL2. In the disclosure, the clock signal SCLK group may mean a clock signal SCLK transmitted during a period corresponding to the period during which one data packet, such as the address signal, the command signal, or touch sensing data, is transmitted. For example, when 1-bit data is transmitted according to one clock signal SCLK, 8 clock signals SCLK used when transmitting 8-bit data may mean one clock signal SCLK group.

The touch driving circuit 150 may identify data to be transmitted/received according to an instruction of the touch controller 160 by identifying the address signal and the command signal. For example, the address signal may designate the address of the area where data is to be stored, and the command signal may indicate either write or read. The touch driving circuit 150 may identify whether the touch controller 160 has instructed transmission of touch sensing data by identifying the area indicated by the address signal and the content according to the command signal.

The touch driving circuit 150 may transmit third touch sensing data TSD3 through the second data transmission line DTL2 when it is identified that the touch controller 160 has instructed transmission of the touch sensing data. After receiving the command signal, the touch driving circuit 150 may transmit the third touch sensing data TSD3 following the second touch sensing data TSD2.

For example, when transmitting N touch sensing data, the touch driving circuit 150 may transmit N touch sensing data to the touch controller 160 through N packets.

Since the level of the communication control line CCL becomes the communication start level after transmitting the touch interrupt signal, the touch driving circuit 150 may predict that the touch controller 160 will instruct transmission of touch sensing data. Accordingly, the touch driving circuit 150 may start transmitting touch sensing data according to the first clock signal SCLK group after communication starts. Thus, the touch driving circuit 150 transmits the first touch sensing data TSD1 to the touch controller 160 without the touch controller 160 requesting the first touch sensing data TSD1.

The touch driving circuit 150 may determine whether to maintain transmission of the touch sensing data by identifying the address signal and command signal received through the first data transmission line DTL1 during the period of transmitting the first touch sensing data TSD1 and the second touch sensing data TSD2 through the second data transmission line DTL2.

If it is identified that the touch controller 160 has instructed transmission of touch sensing data according to the address signal and command signal, the touch driving circuit 150 may maintain transmission of the touch sensing data to reduce the transmission time of touch sensing data and transmit touch sensing data to the touch controller 160. That is, the touch driving circuit 150 may continue to transmit touch sensing data (e.g., TSD3 to TSDn) responsive to the address signal and the command signal being indicative of a request for touch sensing data from the touch driving circuit 150.

Since the touch sensing data transmission time is reduced, the number of clock signals SCLK output through the clock signal line CSL during the touch sensing data transmission period may also be reduced. The communication period between the touch controller 160 and the touch driving circuit 150 may be reduced so that power consumption may be reduced.

When it is identified that the touch controller 160 has not instructed transmission of touch sensing data after receiving the address signal and command signal, the touch driving circuit 150 may perform transmission/reception of data according to the command signal.

Figure 4:
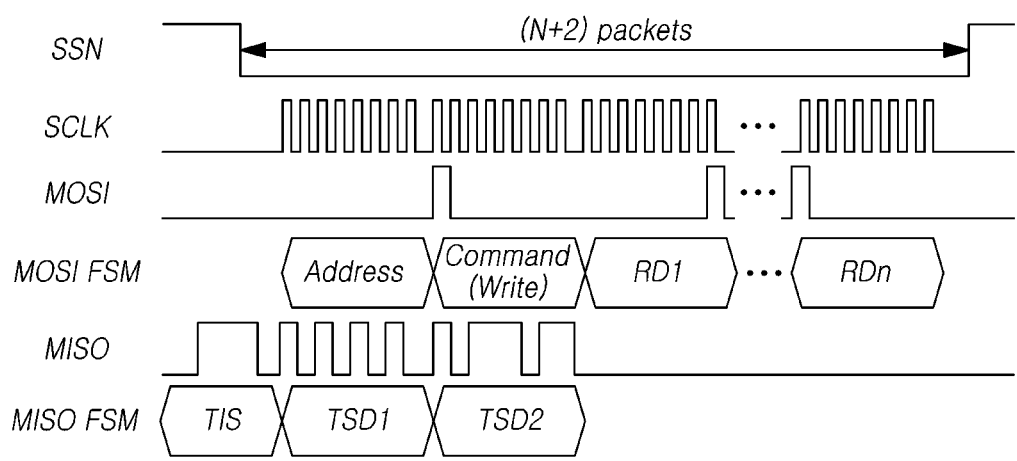

For example, referring to FIG. 4, the touch driving circuit 150 may transmit the touch interrupt signal TIS to the touch controller 160 through the second data transmission line DTL2. The touch controller 160 may change the level of the communication control line CCL to the communication start level by changing the level of the communication control signal SSN transmitted through the communication control line CCL to a low level.

During the period when the address signal is received through the first data transmission line DTL1 after the level of the communication control line CCL reaches the communication start level, the touch driving circuit 150 may transmit the first touch sensing data TSD1 to the touch controller 160 through the second data transmission line DTL2. During the period when the command signal is received through the first data transmission line DTL1, the touch driving circuit 150 may transmit the second touch sensing data TSD2 to the touch controller 160 through the second data transmission line DTL2.

The touch driving circuit 150 may identify the address signal and the command signal. The command signal may not be requesting touch data. According to the address signal and the command signal, the touch driving circuit 150 may receive data other than the address signal and the command signal through the first data transmission line DTL1, for example, during a period when the third touch sensing data TSD3 is transmitted, or after receiving the command signal. In addition, the touch driving circuit 150 may transmit data other than the touch sensing data to the touch controller 160 through the first data transmission line DTL1 during a period when the third touch sensing data TSD3 is transmitted. In addition, the touch driving circuit 150 may transmit data other than the touch sensing data to the touch controller 160 through the second data transmission line DTL2 after receiving the command signal.

For example, when the address signal and the command signal indicate writing data to a register of the touch driving circuit 150, the touch driving circuit 150 may transmit/receive data to write data to the register.

For example, the touch driving circuit 150 may stop transmitting touch sensing data after receiving the command signal. After receiving the command signal, the touch driving circuit 150 may receive register data RD1, . . . , RDn through the first data transmission line DTL1. The register data RD1, . . . , RDn received from the touch controller 160 through the first data transmission line DTL1 may be written to the register of the touch driving circuit 150.

Even when the touch driving circuit 150 stops the transmission of touch sensing data after receiving the address signal and the command signal and writes the register data RD1, . . . , RDn, data transmission/reception is performed using (N+2) packets when writing N register data RD1, . . . , RDn. Thus, the data transmission/reception period for writing the N register data RD1, . . . , RDn may not increase.

Further, data transmission/reception may be performed in a similar manner even when the address signal and command signal of the touch controller 160 indicate transmission/reception of data other than the touch sensing data through the second data transmission line DTL2.

Figure 5:
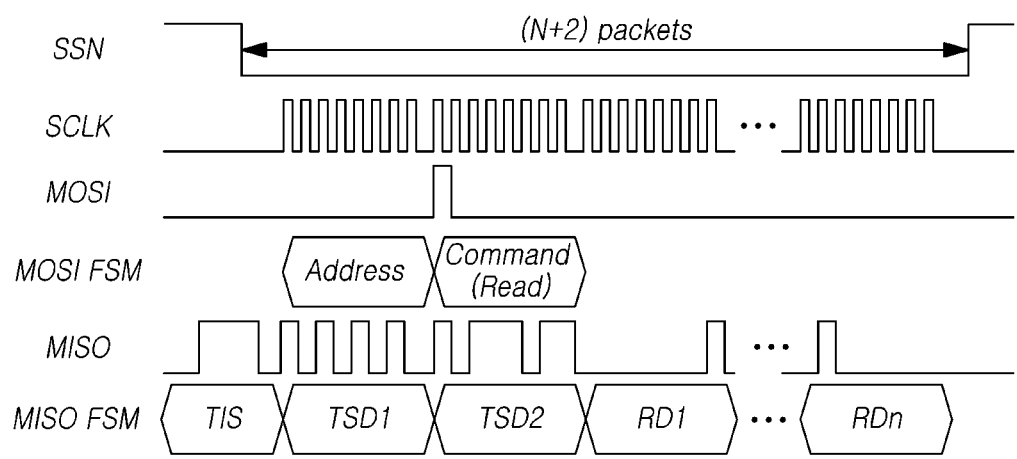

As an example, referring to FIG. 5, the touch driving circuit 150 may transmit the touch interrupt signal TIS, and the level of the communication control line CCL may reach the communication start level.

The touch driving circuit 150 may transmit the first touch sensing data TSD1 and the second touch sensing data TSD2 to the touch controller 160 through the second data transmission line DTL2 during the period when the address signal and command signal are received through the first data transmission line DTL1.

The touch driving circuit 150 may receive the address signal and command signal and identify a data transmission/reception operation indicated by the address signal and command signal. The operation indicated by the address signal and command signal may be the operation of reading the data stored in the register of the touch driving circuit 150.

The touch driving circuit 150 may stop transmitting touch sensing data after receiving the command signal. The touch driving circuit 150 may transmit register data RD1 to RDn to the touch controller 160 through the second data transmission line DTL2 according to the command signal. When the touch controller 160 reads N register data RD1, . . . , RDn, data transmission/reception may be performed through (N+2) packets.

As such, the touch driving circuit 150 that has transmitted the touch interrupt signal TIS may transmit touch sensing data simultaneously with reception of the address signal and command signal if communication starts, thereby reducing the transmission time of touch sensing data.

Further, when the data transmission/reception operation according to the address signal and command signal does not indicate transmission of touch sensing data, data transmission/reception operation according to the command signal may be performed after transmission/reception of the command signal. Accordingly, the data transmission/reception operation according to the command signal may be performed without increasing the communication time.

Further, in some cases, the touch driving circuit 150 may start transmitting touch sensing data without transmitting the touch interrupt signal TIS.

Figure 6:
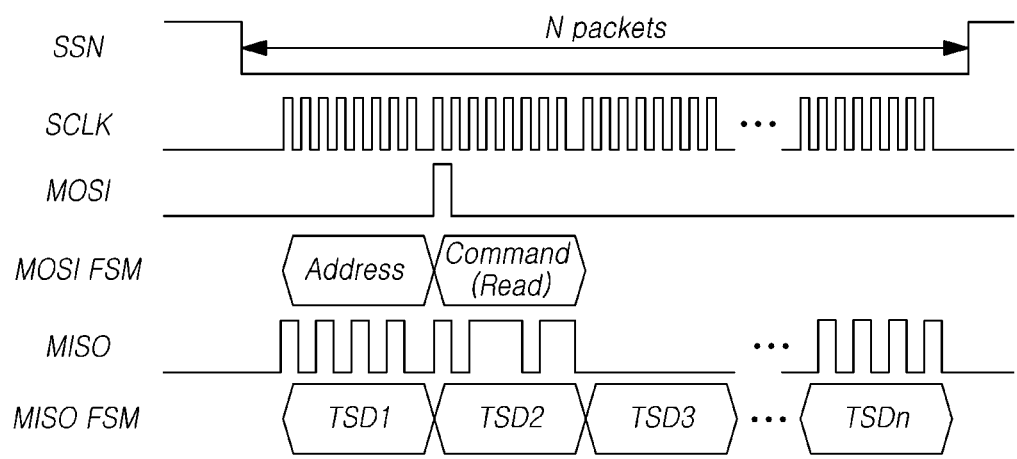

As an example, referring to FIG. 6, the level of the communication control signal SSN transmitted through the communication control line CCL by the touch controller 160 is changed to the low level, so that the level of the communication control line CCL may reach the communication start level.

The touch controller 160 may transmit the address signal and command signal to the touch driving circuit 150 through the first data transmission line DTL1.

The touch driving circuit 150 may transmit the first touch sensing data TSD1 and the second touch sensing data TSD2 to the touch controller 160 through the second data transmission line DTL2 during the period when the address signal and command signal are received.

Upon receiving the command signal, the touch driving circuit 150 may identify whether the touch controller 160 has instructed transmission of touch sensing data through the address signal and command signal.

The touch driving circuit 150 may sequentially transmit the third touch sensing data TSD3, . . . , nth touch sensing data TSDn to the touch controller 160 through the second data transmission line DTL2 after identifying the command signal.

By starting transmission of touch sensing data according to the first clock signal SCLK group according to the start of communication even when not transmitting the touch interrupt signal TIS, the touch driving circuit 150 may reduce the transmission period of touch sensing data when the touch controller 160 instructs to read touch sensing data.

When the touch controller 160 does not instruct to read touch sensing data, the touch driving circuit 150 may stop transmission of touch sensing data as in the example described above and perform the data transmission/reception operation according to the address signal and command signal to thereby perform data transmission/reception required without increasing the data transmission/reception period.

Further, in some cases, at least one of the first data transmission line DTL1 and the second data transmission line DTL2 may provide bi-directional communication and further increase the touch sensing data transmission efficiency through the bi-directional communication.

Figure 7:
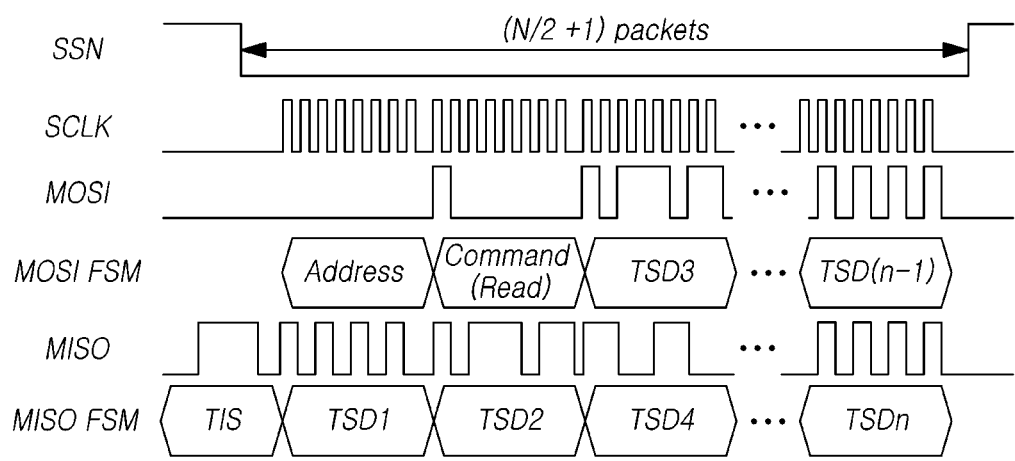

As an example, FIG. 7 illustrates an example in which the touch driving circuit 150 transmits the touch interrupt signal TIS through the second data transmission line DTL2.

The touch interrupt signal TIS may be transmitted through the second data transmission line DTL2, and the level of the communication control line CCL may be changed to the communication start level.

When the level of the communication control line CCL reaches the communication start level, the touch controller 160 may transmit the address signal and command signal to the touch driving circuit 150 through the first data transmission line DTL1 according to the first clock signal SCLK group and the second clock signal SCLK group transmitted through the clock signal line CSL.

The touch driving circuit 150 may transmit the first touch sensing data TSD1 and the second touch sensing data TSD2 to the touch controller 160 through the second data transmission line DTL2 according to the first clock signal SCLK group and the second clock signal SCLK group.

The touch driving circuit 150 may receive the command signal and then identify a data transmission/reception operation indicated by the address signal and command signal.

When it is identified that the address signal and the command signal indicate transmission of touch sensing data, the touch driving circuit 150 may transmit touch sensing data through at least one of the first data transmission line DTL1 and the second data transmission line DTL2. For example, the first data transmission line DTL1 may provide bi-directional communication.

The touch driving circuit 150 may transmit the third touch sensing data TSD3 to the touch controller 160 through one of the first data transmission line DTL1 and the second data transmission line DTL2 and transmit the fourth touch sensing data TSD4 to the touch controller 160 through the other of the first data transmission line DTL1 and the second data transmission line DTL2.

When the touch driving circuit 150 transmits N touch sensing data, it may transmit N touch sensing data during a period when (N/2+1) packets are transmitted.

Further, when the address signal and command signal do not indicate transmission of touch sensing data, data transmission/reception according to the address signal and command signal may be performed.

Or, when at least one of the first data transmission line DTL1 and the second data transmission line DTL2 provides bi-directional communication, even when the address signal and command signal do not indicate transmission of touch sensing data, the data transmission/reception operation indicated by the address signal and command signal may be performed while maintaining transmission of touch sensing data.

Figure 8:
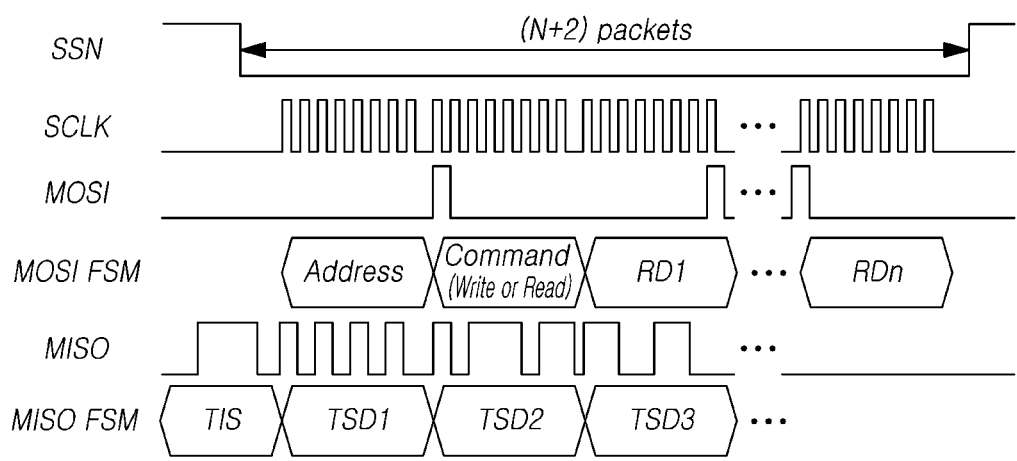

For example, referring to FIG. 8, the touch driving circuit 150 may transmit the touch interrupt signal TIS to the touch controller 160 through the second data transmission line DTL2. The touch controller 160 may change the level of the communication control line CCL to the communication start level.

The touch controller 160 may transmit the address signal and command signal to the touch driving circuit 150 through the first data transmission line DTL1.

The touch driving circuit 150 may transmit the first touch sensing data TSD1 and the second touch sensing data TSD2 to the touch controller 160 through the second data transmission line DTL2.

The touch driving circuit 150 may receive the command signal and then identify a data transmission/reception operation indicated by the address signal and command signal.

When the data transmission/reception operation indicated by the address signal and the command signal does not indicate transmission (e.g., a request) of touch sensing data, the touch driving circuit 150 may transmit the third touch sensing data TSD3 to the touch controller 160 through the second data transmission line DTL2. The touch driving circuit 150 may maintain transmission of touch sensing data through the second data transmission line DTL2.

The data transmission/reception operation indicated by the address signal and command signal may be performed through the first data transmission line DTL1.

For example, when the address signal and command signal indicate writing of the register data RD1, . . . , RDn, the register data RD1, . . . , RDn may be transmitted to the touch driving circuit 150 through the first data transmission line DTL1.

As another example, when the address signal and command signal indicate reading of the register data RD1, . . . , RDn, the register data RD1, . . . , RDn of the touch driving circuit 150 may be transmitted to the touch controller 160 through the first data transmission line DTL1.

Since the first data transmission line DTL1 provides bi-directional communication, the data transmission/reception operation indicated by the address signal and command signal may be performed by the first data transmission line DTL1. The second data transmission line DTL2 may maintain transmission of touch sensing data.

Even when communication for other data transmission/reception by the touch controller 160 is started, the touch driving circuit 150 may transmit touch sensing data so that the touch driving circuit 150 may perform operations for touch sensing using the touch sensing data transmitted by the touch driving circuit 150 without starting additional communication, if necessary.

Figure 9:
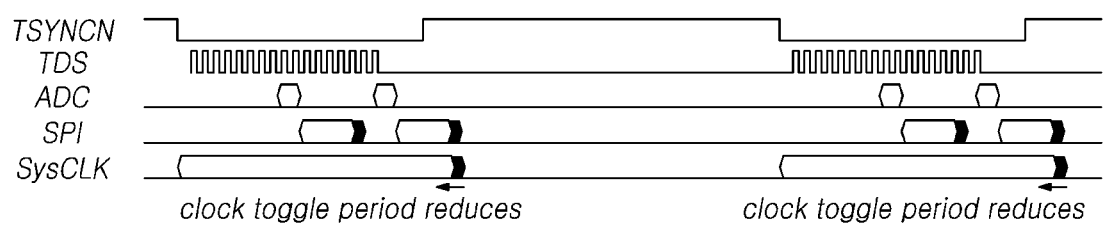
FIG. 9 is a view illustrating an example touch sensing method of a touch display device according to embodiments of the disclosure.

FIG. 9 is a view illustrating an example touch sensing method of a touch display device 100 according to embodiments of the disclosure.

FIG. 9 illustrates an overall example touch sensing method by a touch sensing system including a touch controller 160 and a touch driving circuit 150.

The touch driving signal TDS may be supplied to the touch electrode TE during the period when the touch synchronization signal TSYNCN is at a low level. The touch driving signal TDS may be output by the touch driving circuit 150. The touch driving circuit 150 may output the touch driving signal TDS using a pulse-type signal input from the outside.

The pulse-type signal input to the touch driving circuit 150 may be generated and supplied by a touch power circuit positioned inside or outside the touch controller 160.

The touch driving circuit 150 may convert the touch sensing signal obtained from the touch electrode TE to which the touch driving signal TDS is applied into digital touch sensing data by an analog-to-digital converter ADC. The touch driving circuit 150 may transmit touch sensing data to the touch controller 160 through SPI (Serial Peripheral Interface) communication.

As in the example described above, the touch driving circuit 150 starts transmitting touch sensing data according to the first clock signal SCLK group when communication with the touch controller 160 starts, so that the communication time using SPI communication may decrease.

Since the communication time decreases, the number of clock signals SCLK transmitted through the clock signal line CSL during the period when communication is performed between the touch controller 160 and the touch driving circuit 150 may decrease.

Further, as the communication time between the touch controller 160 and the touch driving circuit 150 decreases, the system clock signal SysCLK output to the touch driving circuit 150 during the period when transmission/reception of touch sensing data is performed and the period when touch sensing is performed according to the touch synchronization signal TSYNCN by the touch controller 160 may be reduced. The period and number of times the system clock signal SysCLK is toggled may be reduced, and power consumption of the touch sensing system may be reduced.

According to the above-described embodiments of the disclosure, if communication starts, the touch driving circuit 150 transmits touch sensing data during the period when the address signal or the command signal is received, so that the period required to transmit touch sensing data may decrease.

Further, since the touch driving circuit 150 determines whether to transmit touch sensing data after identifying the address signal and command signal, and performs the data transmission/reception operation indicated by the address signal and command signal, the required data transmission/reception operation may be performed without increasing the communication time.

Further, in some cases, the first data transmission line DTL1 and the second data transmission line DTL2 between the touch controller 160 and the touch driving circuit 150 may provide bi-directional communication.

In this case, it is possible to further increase the efficiency of the data transmission/reception operation between the touch controller 160 and the touch driving circuit 150 by transmitting the touch sensing data through two data transmission lines or using the two data transmission lines as the line for transmission of the touch sensing data and the line for the data transmission/reception operation indicated by the address signal and command signal.

Embodiments of the disclosure described above are briefly described below.

A touch display device according to embodiments of the disclosure may comprise a plurality of touch electrodes, a plurality of touch lines electrically connected with at least one of the plurality of touch electrodes, a touch driving circuit driving the plurality of touch lines, and a touch controller controlling the touch driving circuit.

The touch driving circuit may generate touch sensing data according to a touch sensing signal received through at least one of the plurality of touch lines and, if the touch controller changes a level of a communication control line to a communication start level, transmit the touch sensing data to the touch controller through a second data transmission line during a period when the touch controller transmits an address signal or a command signal to the touch driving circuit through a first data transmission line.

The touch driving circuit may start transmission of a touch interrupt signal to the touch controller through the second data transmission line before the level of the communication control line is changed to the communication start level.

The touch driving circuit may transmit the touch sensing data to the touch controller through the second data transmission line according to a first clock signal group received through a clock signal line after the transmission of the touch interrupt signal is complete.

The touch driving circuit may transmit the touch sensing data to the touch controller through the second data transmission line according to a first clock signal group received through a clock signal line when the level of the communication control line is changed to the communication start level.

The touch driving circuit may transmit first touch sensing data to the touch controller through the second data transmission line during a period when the address signal is received through the first data transmission line. The touch driving circuit may transmit second touch sensing data to the touch controller through the second data transmission line during a period when the command signal is received through the first data transmission line.

The touch driving circuit may transmit third touch sensing data to the touch controller through the second data transmission line after receiving the command signal.

In this case, the touch driving circuit may receive data other than the address signal and the command signal from the touch controller through the first data transmission line during a period when the third touch sensing data is transmitted.

Or, the touch driving circuit may transmit data other than the touch sensing data to the touch controller through the first data transmission line during a period when the third touch sensing data is transmitted.

After receiving the command signal, the touch driving circuit may transmit third touch sensing data to the touch controller through one of the first data transmission line and the second data transmission line and transmit fourth touch sensing data to the touch controller through the other of the first data transmission line and the second data transmission line.

The touch driving circuit may stop transmitting the touch sensing data after receiving the command signal.

In this case, the touch driving circuit may receive data other than the address signal and the command signal from the touch controller through the first data transmission line after receiving the command signal.

Or, the touch driving circuit may transmit data other than the touch sensing data to the touch controller through the second data transmission line after receiving the command signal.

A touch driving circuit according to embodiments of the disclosure may comprise a sensing data generation module generating touch sensing data according to a touch sensing signal received through at least one of a plurality of touch lines and a sensing data transmission module transmitting the touch sensing data to an outside according to a first clock signal group received through a clock signal line if a level of a communication control line is changed to a communication start level.

The sensing data transmission module may start transmission of a touch interrupt signal through a data transmission line through which the touch sensing data is transmitted before the level of the communication control line is changed to the communication start level.

The sensing data transmission module may transmit the touch sensing data through a second data transmission line during a period when an address signal or a command signal is received through a first data transmission line.

The sensing data transmission module may transmit the touch sensing data through at least one of the first data transmission line or the second data transmission line after receiving the command signal.

After receiving the command signal, the sensing data transmission module may stop the transmission of the touch sensing data, receive data other than the address signal and the command signal through the first data transmission line, or transmit data other than the touch sensing data through the second data transmission line.

After receiving the command signal, the sensing data transmission module may transmit the touch sensing data through the second data transmission line and receive or transmit data other than the address signal, the command signal, and the touch sensing data through the first data transmission line.

A sensing system according to embodiments of the disclosure may comprise a sensing driving circuit generating sensing data according to a sensing signal obtained through a sensing line and a sensing controller controlling the sensing driving circuit, wherein the sensing driving circuit transmits the sensing data to the sensing controller through a data transmission line according to a first clock signal group received through a clock signal line if the sensing controller changes a level of a communication control line to a communication start level.

The sensing driving circuit may receive an address signal or a command signal from the sensing controller through a data transmission line other than the data transmission line through which the sensing data is transmitted during a period when the first clock signal group is received.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims.

What is claimed:

1. A touch display device, comprising:
a plurality of touch electrodes;
a plurality of touch lines electrically connected with the plurality of touch electrodes;
a touch driving circuit configured to drive the plurality of touch lines; and
a touch controller configured to control the touch driving circuit,
wherein the touch driving circuit is configured to generate touch sensing data according to a touch sensing signal received through at least one of the plurality of touch lines, and the touch driving circuit is configured to transmit a first touch sensing data to the touch controller through a second data transmission line simultaneously during a first period while the touch controller transmits an address signal to the touch driving circuit through a first data transmission line and a second touch sensing data to the touch controller through a second data transmission line simultaneously during a second period while the touch controller transmits a command signal to the touch driving circuit through a first data transmission line responsive to the touch controller changing a level of a signal on a communication control line to a communication start level that is indicative to start communication between the touch driving circuit and the touch controller.

2. The touch display device of claim 1, wherein the touch driving circuit is configured to start transmission of a touch interrupt signal to the touch controller via the second data transmission line before the level of the signal on the communication control line is changed to the communication start level.

3. The touch display device of claim 2, wherein the touch driving circuit is configured to transmit the touch sensing data to the touch controller through the second data transmission line according to a first clock signal group received through a clock signal line, the first clock signal group received after the transmission of the touch interrupt signal is complete.

4. The touch display device of claim 1, wherein the touch driving circuit transmits the touch sensing data to the touch controller through the second data transmission line according to a first clock signal group received through a clock signal line responsive to the level of the communication control line being changed to the communication start level.

5. The touch display device of claim 1, wherein the touch driving circuit transmits third touch sensing data to the touch controller through the second data transmission line after receiving the command signal.

6. The touch display device of claim 5, wherein the touch driving circuit receives data other than the address signal and the command signal from the touch controller through the first data transmission line during a period while the third touch sensing data is transmitted.

7. The touch display device of claim 5, wherein the touch driving circuit transmits data other than the touch sensing data to the touch controller through the first data transmission line during a period while the third touch sensing data is transmitted.

8. The touch display device of claim 1, wherein after receiving the command signal, the touch driving circuit transmits third touch sensing data to the touch controller through one of the first data transmission line and the second data transmission line and transmits fourth touch sensing data to the touch controller through the other of the first data transmission line and the second data transmission line.

9. The touch display device of claim 1, wherein the touch driving circuit stops the transmission of the touch sensing data after receiving the command signal.

10. The touch display device of claim 9, wherein the touch driving circuit receives data other than the address signal and the command signal from the touch controller through the first data transmission line after receiving the command signal.

11. The touch display device of claim 9, wherein the touch driving circuit transmits data other than the touch sensing data to the touch controller through the second data transmission line after receiving the command signal.

12. A sensing system, comprising:
a sensing driving circuit configured to generate sensing data according to a sensing signal obtained through a sensing line; and
a sensing controller configured to control the sensing driving circuit,
wherein the sensing driving circuit is configured to transmit the sensing data to the sensing controller through a data transmission line according to a first clock signal group received through a clock signal line simultaneously during a first period during which an address signal is transmitted and a second period while an command signal is transmitted responsive to the sensing controller changing a level of a signal on a communication control line to a communication start level that is indicative to start communication between the sensing driving circuit and the sensing controller.

13. The sensing system of claim 12, wherein the sensing driving circuit receives the address signal and the command signal from the sensing controller through a data transmission line other than the data transmission line through which the sensing data is transmitted during a period while the first clock signal group is received.

14. A touch display device comprising:
a display panel;
a plurality of touch electrodes in the display panel;
a touch driving circuit configured to transmit a touch driving signal to the plurality of touch electrodes and receive a touch sensing signal via a plurality of touch lines; and
a touch controller configured to communicate with the touch driving circuit,
wherein the touch driving circuit is configured to generate first touch sensing data based on the touch sensing signal and transmit the first touch sensing data to the touch controller through a second data transmission line simultaneously during a first period during a first period during which the touch controller transmits an address signal to the touch driving circuit through a first data transmission line and a second touch sensing data to the touch controller through a second data transmission line simultaneously during a second period while the touch controller transmits a command signal to the touch driving circuit through a first data transmission line without the touch controller requesting the first touch sensing data.

15. The touch display device of claim 14, wherein the touch controller transmits a command to the touch driving circuit through the first data transmission line after the address signal is transmitted to the touch driving circuit, and the touch driving circuit transmits second touch sensing data to the touch controller through the second data transmission line while the command is transmitted to the touch driving circuit.

16. The touch display device of claim 15, wherein the touch driving circuit transmits third touch sensing data to the touch controller through the second data transmission line responsive to the address signal and the command being indicative of a request for touch sensing data from the touch driving circuit.

17. The touch display device of claim 15, wherein the touch driving circuit is configured to stop transmission of touch sensing data and transmit data other than the touch sensing data to the touch controller through at least one of the first data transmission line or the second data transmission line responsive to the address signal and the command being indicative of a request for the data that is not touch sensing data.

18. The touch display device of claim 14, wherein the touch driving circuit transmits the first touch sensing data to the touch controller responsive to the touch controller changing a level of a signal on a communication control line to a communication start level that is indicative to start communication between the touch driving circuit and the touch controller.

* * * * *